(12) United States Patent
Ramu

(10) Patent No.: US 8,716,961 B2
(45) Date of Patent: May 6, 2014

(54) SWITCHED RELUCTANCE AND PM BRUSHLESS DC MOTOR DRIVE CONTROL FOR ELECTRIC VEHICLE APPLICATION

(75) Inventor: Krishnan Ramu, Blacksburg, VA (US)

(73) Assignee: Regal Beloit America, Inc., Beloit, WI (US)

(*) Notice: Subject to any disclaimer, the term of this patent is extended or adjusted under 35 U.S.C. 154(b) by 356 days.

(21) Appl. No.: 13/287,234

(22) Filed: Nov. 2, 2011

(65) Prior Publication Data

US 2012/0104980 A1 May 3, 2012

Related U.S. Application Data

(60) Provisional application No. 61/409,638, filed on Nov. 3, 2010.

(51) Int. Cl.
*H02P 1/00* (2006.01)
(52) U.S. Cl.
USPC ............. 318/139; 318/369; 318/376
(58) Field of Classification Search
USPC ........... 318/139, 369, 376, 400.3, 434, 459, 318/806
See application file for complete search history.

(56) References Cited

U.S. PATENT DOCUMENTS 6,988,689 B2 * 1/2006 Thomas et al. ............... 242/563

* cited by examiner

*Primary Examiner* — Karen Masih
(74) *Attorney, Agent, or Firm* — NSIP Law

(57) ABSTRACT

A method of operating an electrical machine having first and second phase windings. The method includes: (1) applying positive first current to the first phase winding while the first phase winding's back electromotive force (emf) is positive; (2) applying negative second current to the first phase winding while the first phase winding's back emf is negative; and (3) applying positive third current to the second phase winding while the second phase winding's back emf is positive. The first current is conducted through a circuit composed of a battery, the first phase winding, and a first switch. The second current is conducted through a circuit composed of a first capacitive storage element, the battery, the first phase winding, and a second switch, and the third current is conducted through a circuit composed of the battery, the second phase winding, and a third switch.

30 Claims, 6 Drawing Sheets

| $\varnothing_r$ | Phase | Current polarity | Transistor gate |
|---|---|---|---|
| 0 to $\pi/2$ | A | Positive | $T_{A2}$ |
| $\pi/2$ to $3\pi/2$ | B | Positive | $T_B$ |
| $3\pi/2$ to $2\pi$ | A | Negative | $T_{A1}$ |

Fig. 6

SWITCHED RELUCTANCE AND PM BRUSHLESS DC MOTOR DRIVE CONTROL FOR ELECTRIC VEHICLE APPLICATION

This application claims priority to U.S. provisional application 61/409,638, filed on Nov. 3, 2010, the content of which is incorporated herein by reference.

BACKGROUND OF THE RELATED ART

Low cost motor drives in vehicle applications, such as electric bikes (hereafter referred to as E-Bikes) operated with battery-stored energy, are sought after because of their positive impact on the environment, the existing mass market of electric bikes, and the limited financial resources of the user community in countries such as China, India, and other developing nations. One of the significant cost elements in a motor drive is the power converter circuit, particularly in the number of power devices such as transistors and power diodes. Economy in the use of power devices translates into reduced control circuit components, such as gate drives, logic power supplies, and device protection circuits; such economy also leads to reduced printed circuit board area, heat-sink volume, and weight. Fewer power devices also leads to lower cost of the power electronic system for the motor drive.

SUMMARY OF THE INVENTION

The invention disclosed herein provides control techniques for a low-cost power converter applied to vehicle applications, including E-Bikes. The power converter has a small number of power devices and operates from energy stored in a battery. Batteries may be connected in series, in parallel, or both in series and in parallel to obtain a certain desired direct-current (dc) voltage, and such an arrangement is designated, herein, as a battery bank. The power converter: (1) may charge a battery without a separate power electronic circuit, using its own components for this purpose, and (2) does not require a separate inductor (or choke) to charge the batteries; instead, the windings of a switched reluctance machine or permanent magnet brushless dc machine are used for smoothing a controlled, rectified voltage for charging the batteries.

The control techniques relate to the operation of the power converter during motoring and provide enhanced electromagnetic torque operation of the machine. One control technique provides ripple-free operation of the electric machine.

These and other objects of the invention may be achieved, in whole or in part, by a method of operating an electrical machine having first and second phase windings. The method includes: (1) applying positive first current to the first phase winding while the first phase winding's back electromotive force (emf) is positive; (2) applying negative second current to the first phase winding while the first phase winding's back emf is negative; and (3) applying positive third current to the second phase winding while the second phase winding's back emf is positive. The first current is conducted through a circuit consisting of a battery, the first phase winding, and a first switch that is operating in a conductive state. The second current is conducted through a circuit consisting of a first capacitive storage element, the battery, the first phase winding, and a second switch that is operating in a conductive state, and the third current is conducted through a circuit consisting of the battery, the second phase winding, and a third switch that is operating in a conductive state.

Additionally, the objects of the invention may be achieved, in whole or in part, by a method of operating an electrical machine having a stator, a rotor, and first and second phase windings. The method includes: (1) applying positive first current to the first phase winding while the rotor is within a first range of rotation with respect to the stator; (2) applying negative second current to the first phase winding while the rotor is within a second range of rotation with respect to the stator; and (3) applying positive third current to the second phase winding while the rotor is within a third range of rotation with respect to the stator. The first current is conducted through a circuit consisting of a battery, the first phase winding, and a first switch that is operating in a conductive state. The second current is conducted through a circuit consisting of a first capacitive storage element, the battery, the first phase winding, and a second switch that is operating in a conductive state, and the third current is conducted through a circuit consisting of the battery, the second phase winding, and a third switch that is operating in a conductive state.

Still further, the objects of the invention may be achieved, in whole or in part, by a electrical machine system having an electrical machine with a stator, a rotor, and first and second phase windings. A processor generates a logical-TRUE condition for: (1) a first rotor range signal when the rotor is within a first range of rotation with respect to the stator, (2) a second rotor range signal when the rotor is within a second range of rotation with respect to the stator, and (3) a third rotor range signal when the rotor is within a third range of rotation with respect to the stator, and otherwise generates a logical-FALSE condition for the first, second, and third rotor range signals. A phase current controller generates a logical-TRUE condition for: (1) a first phase current signal when both a pulse width modulation (PWM) signal has a logical-TRUE condition and current conducted through the first phase winding is positive, (2) a second phase current signal when both the PWM signal has a logical-TRUE condition and current conducted through the first phase winding is negative, and (3) a third phase current signal when both the PWM signal has a logical-TRUE condition and current conducted through the second phase winding is positive, and otherwise generates a logical-FALSE condition for the first, second, and third phase current signals. Logic circuitry generates a logical-TRUE condition for: (1) a first gate signal when both the first rotor range signal and first phase current signal have a logical-TRUE condition, (2) a second gate signal when both the second rotor range signal and second phase current signal have a logical-TRUE condition, and (3) a third gate signal when both the third rotor range signal and third phase current signal have a logical-TRUE condition, and otherwise generates a logical-FALSE condition for the first, second, and third gate signals. A power converter: (1) conducts current from a first source through the first phase winding when the first gate signal has a logical-TRUE condition, (2) conducts current from a second source through the first phase winding when the second gate signal has a logical-TRUE condition, and (3) conducts current from either the first or second source through the second phase winding when the third gate signal has a logical-TRUE condition.

BRIEF DESCRIPTION OF THE DRAWINGS

Preferred embodiments of the invention are described in the following paragraphs of the specification and may be better understood when read in conjunction with the attached drawings, in which:

FIG. 6 summarizes, for each angular rotor position, the current conduction state of each, transistor and the polarity applied to phases A and B for the power converter illustrated by FIG. 1.

DETAILED DESCRIPTION OF THE INVENTION

Figure 1:
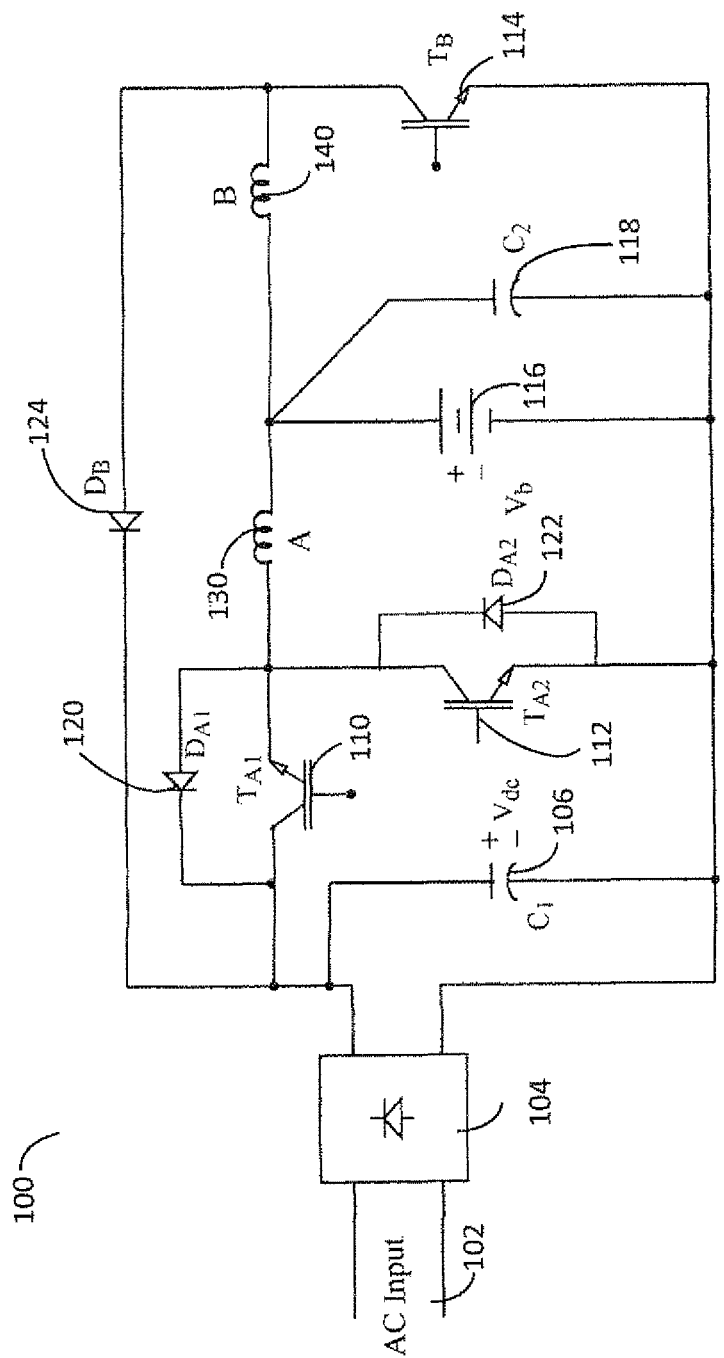
FIG. 1 illustrates a first embodiment of a power converter.

FIG. 1 illustrates a first embodiment of a power converter. Power converter 100 receives a single-phase, alternating current (ac) supply voltage 102 provided by a utility grid. Supply voltage 102 is rectified through a single-phase, bridge rectifier 104 and filtered with a capacitor $C_1$ 106, so as to produce a direct current (dc) voltage, $V_{dc}$, across capacitor 106. $V_{dc}$ is also referred to as a dc link voltage. Power converter 100 provides operational modes of battery-bank charging, motoring, and regeneration.

During the charging mode of operation, $V_{dc}$ charges a battery bank 116 via a buck converter, which comprises a transistor 110, diode 122, and phase-A winding 130. The charging of battery bank 116 is accomplished by changing the on-time duration of transistor 110, using pulse width modulation (PWM) control, so that current in phase-A winding 130 is regulated to a desired charging current of battery bank 116. Transistor 110 is turned on and off with a duty cycle of d so that current conducted through transistor 110 charges battery bank 116 to a voltage $V_b$ through phase-A winding 130, which also serves as a voltage-smoothing inductor. Thus, during the charging operation, sonic energy from capacitor 106 is transferred to battery bank 116 and other such energy is transferred to phase-A winding 130.

When current conveyed to battery bank 116 exceeds an established limit, transistor 110 is turned off. After transistor 110 is switched off energy stored within phase-A winding 130 will be discharged as a current flowing through phase-A winding 130, battery bank 116, and diode 122. Thus, battery bank 116 continues to charge for some time after transistor 110 is switched off. The rate of charging battery bank 116 is determined by a reference current command in a feedback-current control loop of a buck power-conversion control system.

During the motoring operational mode of a phase-B winding 140, a transistor 114 is switched on so that battery bank 116 discharges its stored energy by conveying a current through phase-B winding 140 and transistor 114. Current regulation is achieved by controlling transistor 114 with an appropriate PWM signal. When transistor 114 is turned off, the energy stored in phase-B winding 140 is discharged by the conduction of current through phase-B winding 140, a diode 124, capacitor 106, and a capacitor 118; as energy is discharged from phase-B winding 140, the voltage applied across phase-B winding 140 is $-(V_{dc}-V_b)$. With $V_d$, greater than $V_b$, the commutation of current can be faster.

Phase-A winding 130 may be energized via a boost circuit comprising transistor 112 and battery bank 116. Upon switching on transistor 112, current is conveyed by battery bank 116 through phase-A winding 130 and transistor 112. When the current conveyed through phase-A winding 130 exceeds an established limit or the energy stored within phase-A winding 130 needs to be discharged, transistor 112 is turned off and the stored energy within phase-A winding 130 is discharged by the conveyance of a current through phase-A winding 130, diode 120, capacitor 106, and capacitor 118. Energy discharged by phase-A winding 130 is stored by capacitor 106. As phase-A winding 130 discharges its stored energy, a voltage $-(V_{dc}-V_b)$ is applied across phase-A winding 130, which forces the current flowing through phase-A winding 130 to diminish to zero. Full power is applied to phase A using the boost operation mode.

Phase-A winding 130 may also be powered from the energy stored in capacitor 106 using the buck circuit comprising capacitor 106, transistor 110, phase-A winding 130, and battery bank 116. The operation of powering phase-A winding 130 is similar to the operation of charging battery bank 116, described above. Therefore, phase-A winding 130 can be powered in the motoring mode either from the energy stored in capacitor 106 or that stored in battery bank 116.

The conduction of current through phase B winding 140 is initiated by switching on transistor 114 and is controlled by PWM of transistor 114. The PWM current control is similar to that employed for charging battery bank 116. When transistor 114 is switched off while phase B winding 140 is energized, phase B winding 140 conducts current to capacitor 106 through diode 124, which provides a transfer of energy from phase B winding 140 to capacitor 106. PWM control of phase B winding 140 causes capacitor 106 to be charged multiple times and this energy transferred to capacitor 106 is used to energize phase-A winding 130.

Figure 2:
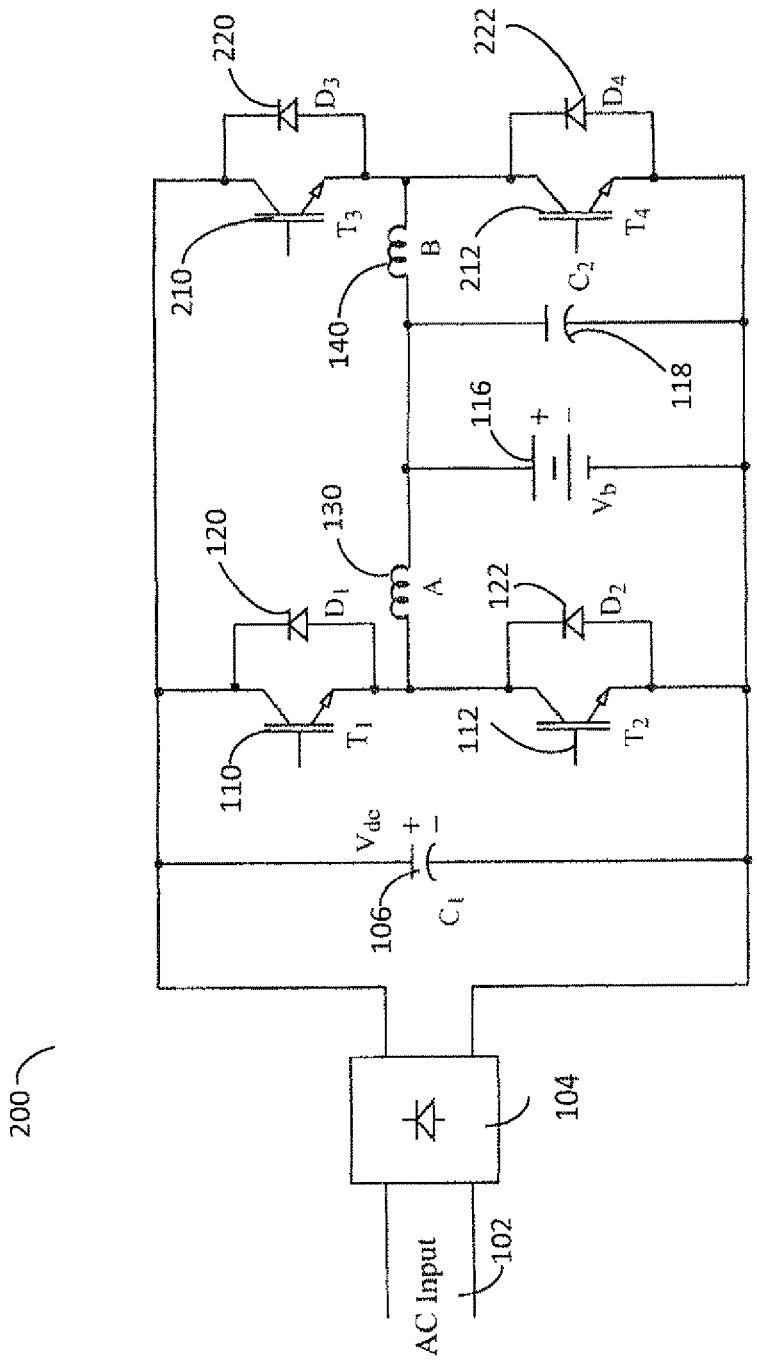
FIG. 2 illustrates a second embodiment of a power converter.

FIG. 2 illustrates a second embodiment of a power converter. Power converter 200 has transistors 110 and 112 with anti-parallel diodes 120 and 122, respectively, across them. Transistors 110 and 112 and diodes 120 and 122 constitute an inverter phase leg, as do transistors 210 and 212 and diodes 220 and 222. Together, these two sets of phase legs of an inverter constitute a single-phase H-bridge inverter, which is available in the form of an intelligent power module with gate drivers and protection circuits for over-current, under-voltage, and over-voltage operation; they are compact in size and very cost effective for mass production.

Transistor 110, phase-A winding 130, battery bank 116, capacitor 106, and diode 122 are used as a buck power circuit for charging battery bank 116 from the dc source voltage, $V_{dc}$. Similarly transistor 210, phase-B winding 140, battery bank 116, capacitor 106, and diode 222 serve as another buck power converter circuit to charge battery bank 116 from capacitor 106. Both avenues for battery charging through phase-A winding 130 and phase-B winding 140 present an opportunity for fast charging.

Rectifier 104 rectifies an ac voltage provided by ac voltage source 102. The rectified voltage is applied across capacitor 106 as $V_{dc}$. When transistor 110 is switched on, capacitor 106 conveys current through transistor 110, phase-A winding 130, and battery bank 116. When transistor 110 is switched off, phase-A winding 130 discharges its stored energy by conducting a current through battery bank 116 and diode 122.

Similarly, transistor 212 is switched on to discharge energy stored in battery bank 116 by the conduction of current through phase-B winding 140 and transistor 212, thereby energizing phase-B winding 140. When transistor 212 is switched off, energy stored by phase-B winding 140 is discharged by the conduction of current through diode 220, capacitor 106, and capacitor 118, thereby charging capacitor 106. Transistor 210 is switched on to conduct current from capacitor 106 through transistor 210, phase-B winding 140, and battery bank 116, thereby energizing phase-B winding 140 and charging battery bank 116. When transistor 210 is switched off, energy stored by phase-B winding 140 is discharged by conducting a current through battery bank 116 and diode 222, thereby charging battery bank 116.

When energization of phase-A winding 130 is in a positive half-cycle (i.e., its induced electromotive force (emf) is in opposition to voltage $V_b$ across battery bank 116), transistor 112 regulates the current in phase-A winding 130. When transistor 112 is turned off to lower the current in phase-A winding 130 or to extinguish the current, phase-A winding 130 discharges its stored energy by conveying current through diode 120, capacitor 106, and capacitor 118.

When the induced emf of phase-A winding 130 is in an additive state, the machine is ready for negative current operation. Switching on transistor 110 causes capacitor 106 to convey current through transistor 110, phase-A winding 130, and battery bank 116.

Injecting positive current when induced emf is negative, and vice versa, enables regenerative braking in a permanent magnet brushless direct current motor (PMBDCM). When an induced emf of phase-A winding 130 is positive (i.e., its polarity is in opposition to $V_b$), transistor 110 is switched on so that a negative current flows through phase-A winding 130, so as to transfer energy from the machine to battery bank 116. Likewise, when induced emf is negative (i.e., when it is additive to $V_b$), transistor 112 is switched on to convey positive current from battery bank 116 through transistor 112. In each instance, regenerative braking slows the speed of the machine.

When current is positive, the induced emf plus $V_b$ act so as to build up current when transistor 112 is turned off, such that the sum of induced emf and $V_b$ drives a current into phase-A winding 130 for transferring energy to capacitor 106. When current in phase-A winding 130 is negative, the induced emf has to be positive; that means induced emf opposes $V_b$, with the result that the sum of $V_{dc}$ and induced emf helps to build up the current when transistor 110 is turned on. When transistor 110 is turned off, to regulate the current, the induced emf assists the energy transfer from phase-A winding 130 to battery bank 116.

Regenerative braking is achieved with phase-B winding 140 in a manner similar to that described above with respect to phase-A winding 130. Positive currents in phase windings 130 and 140 are injected and controlled by transistor 122 and transistor 212, respectively. Similarly negative currents in phase windings 130 and 140 are controlled by transistor 110 and transistor 210, respectively.

Advantages provided by power converter 200 include the following. No external inductor is required for filtering because the machine phases are utilized for this purpose during battery charging from the grid. Both positive and negative currents can be injected into the machine phases, thus increasing the torque of the machine. Full regenerative braking is achieved. Full utilization of electronic devices and machine are achieved. The use of a single-phase, inverter bridge provides compact packaging of the power circuit, resulting in low cost and high reliability. Power converter 200 provides a low-cost solution for the control of a battery operated two-phase PMBDCM drive having high torque output.

Figure 3:
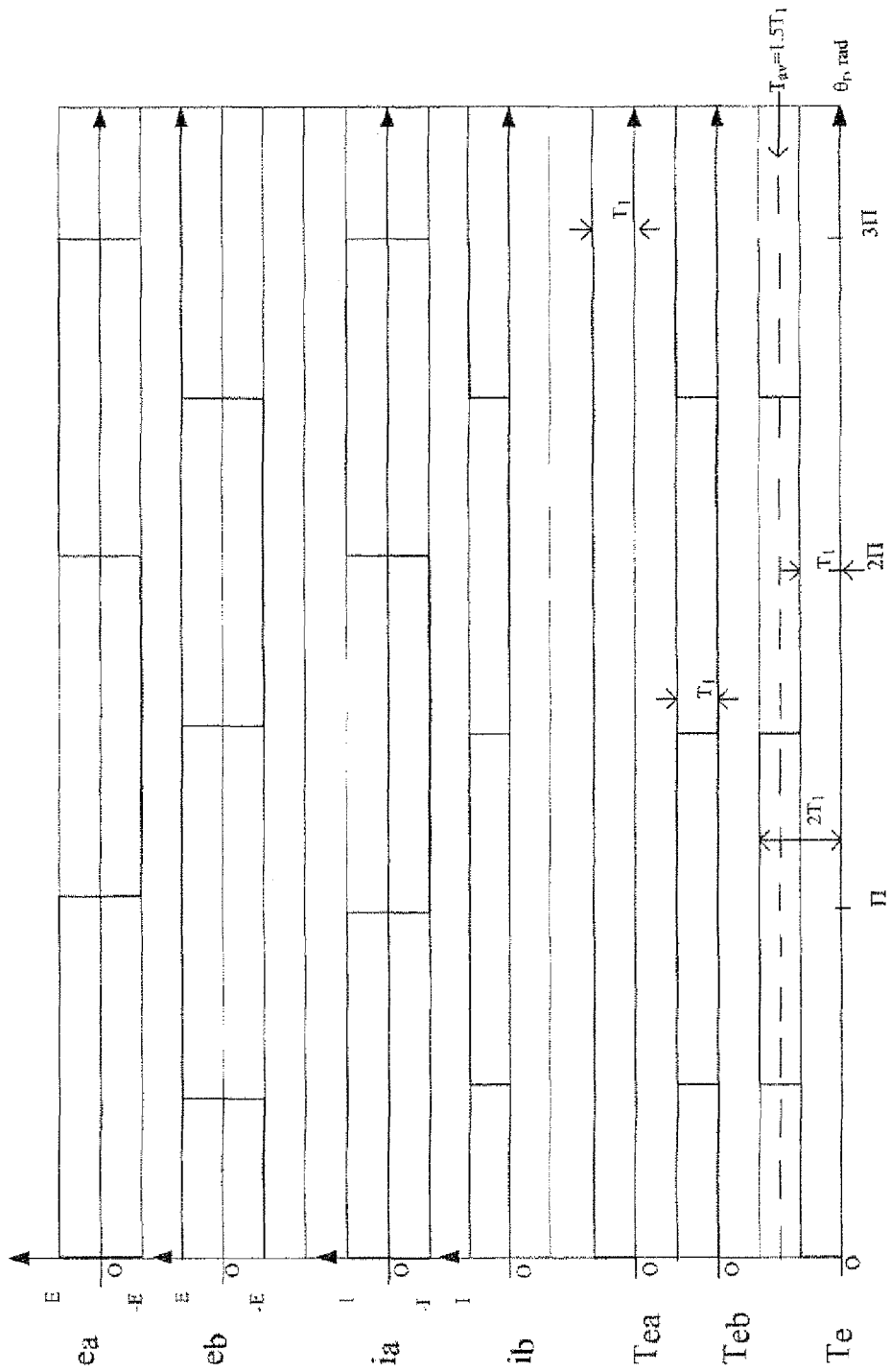
FIG. 3 illustrates voltage, current, phase torque, and total air gap torque applied to the power converter illustrated by FIG. 1, for a first embodiment of the control technique defined by the invention.

FIG. 3 illustrates voltage, current, phase torque, and total air gap torque applied to power converter 100 for a first embodiment of the control technique defined by the invention. The following assumptions are made with regard to the application of the control technique to power converter 100: (1) the torque generated by a two-phase PMBDCM is proportional to current in the phase windings; (2) phase-A winding 130 is operated with alternating current; (3) enough energy is available in capacitor 106 to drive phase-A winding 130; (4) the full voltage $V_b$ of battery 116 is applied across each phase of the machine; only motoring operation is considered; (5) phase-B winding 140 is operated only in its positive half-cycle with positive current (i.e., for 180 electrical degrees); and (6) phase B's back emf is 90 electric degrees out of phase with respect to phase A. Within FIG. 3: (1) $e_a$ and $e_b$ are the induced emfs in phases A and B, respectively; (2) $i_a$ and $i_b$ are currents in phase A and B windings, respectively; (3) the air-gap torques generated by phase A and B excitations are $T_{ea}$ and $T_{eb}$, respectively; (4) the total instantaneous air-gap torque of the machine is $T_e$; (5) $T_{av}$ is the average air-gap torque of the machine; (6) $\theta_r$ is the rotor position in electrical radians; (7) E and I are peak induced emf and current in the machine phases, respectively; and (8) $T_1$ is the torque associated with current in a phase.

When phase A's back emf $e_a$ is positive, a positive current $i_a$ is injected into phase-A winding 130, thereby generating positive torque $T_{ea}$. When phase A's back emf becomes negative, the polarity of current in phase-A winding 130 is reversed and a negative current is injected in phase-A winding 130. Applying negative current when the back emf is negative will still generate a continuous positive torque.

When phase B's back eta $e_b$ is positive, a positive current $i_b$ is injected into phase B winding 140, thereby generating positive torque $T_{eb}$. Phase B's current is commutated when its back emf becomes negative. Thus, the net air-gap torque generated varies between $T_1$ and $2T_1$ and always remains positive. As a result, the maximum average torque generated by the machine, using power converter 100 and full current energization, is $1.5T_1$. The maximum torque that may be obtained by applying alternating current to both phases is $2T_1$, which is not possible with power converter 100 but is possible with converter 200.

With power converter 100, phase A current cannot be maintained (the positive half cycle) at full value if capacitor 106 is not charged sufficiently by current commutation from phase B and during current-control intervals in phase B. Therefore, the average torque can be lower than $1.5T_1$. Further torque derating can occur with the reality of induced emfs departing from their ideal shapes of rectangles.

In summary, the first embodiment of the control technique: (1) applies positive current to a first phase winding of an electrical machine when the first phase winding's back emf is positive, so as to generate positive torque; (2) applies negative current to the first phase winding when the first phase winding's back emf is negative; (3) applies positive current to a second phase winding of the electrical machine when the second phase winding's back emf is positive; and (4) either: (a) discontinues the application of current to the second phase winding when the second phase winding's back emf is negative or (b) applies negative current to the second phase winding when the second phase winding's back emf is negative.

Figure 4:
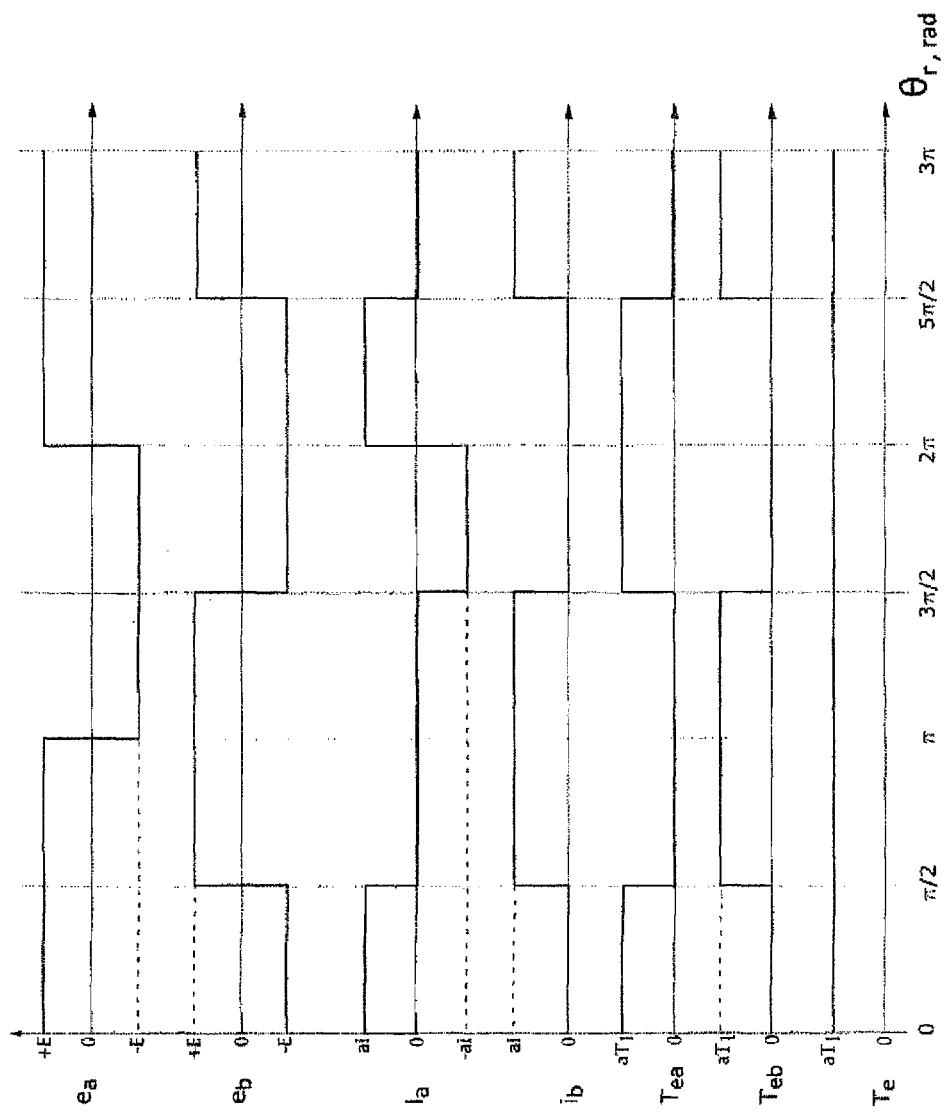
FIG. 4 illustrates voltage, current, phase torque, and total air gap torque applied to the power converter illustrated by FIG. 1, for a second embodiment of the control technique defined by the invention.

FIG. 4 illustrates voltage, current, phase torque, and total air gap torque applied to power converter 100 for a second embodiment of the control technique defined by the invention. The second embodiment provides a smooth and uniform instantaneous torque, for ripple-free operation that is suitable for high-performance applications.

The following assumptions are made with regard to the application of the control technique to power converter 100: (1) phase A has positive and negative currents for $\lambda/2$ radians (i.e., 90 degrees) and conducts current only for $\pi$ radians and (2) phase B has positive current for $\pi$ radians (i.e., 180 degrees). Within FIG. 3: (1) 'a' is a real number between 0 and 1, including 0 and 1 and (2) the stator phase-currents are regulated to be a multiple, a, of the nominal current I (i.e., aI).

Positive phase-A current is injected for the first 90 degrees of positive, induced emf within phase A, so as to generate a torque of $aT_1$, where $T_1$ is the torque generated for nominal current in phase A. Positive current of magnitude aI is injected into phase B for 180 degrees of positive, induced emf, which generates a positive torque of $aT_1$. Phase B cannot be supplied with negative current using power converter 100, but phase A can be injected with negative current. Injecting a negative current, −aI, in phase A for the next 90 degrees, when the phase A induced emf is negative, generates a positive torque of $aT_1$. After the 90 degrees of negative current injection within phase A, the induced emf of phase A changes from negative to positive and therefore, a positive current of aI is injected into phase A for the next 90 degrees, resulting in a positive torque of $aT_1$.

Thus, for 360 degrees of torque generation: (1) phase A is injected with positive current aI during the first 90 degrees, so as to produce torque of $aT_1$; (2) phase B is injected with positive current aI during the next 180 degrees, so as to produce torque of $aT_1$; and (3) phase A is injected with negative current −aI during the last 90 degrees, so as to produce torque of $aT_1$. As a result, uniform torque is generated with a magnitude of $aT_1$. FIG. 6 summarizes, for each angular rotor position, the current conduction state of each of power converter 100's transistors and the polarity applied to phases A and B.

The two embodiments of the control technique have been described in direct reference to power converter 100, but are applicable to power converter 200 and other power converters having features similar to those of power converters 100 and 200.

Figure 5:
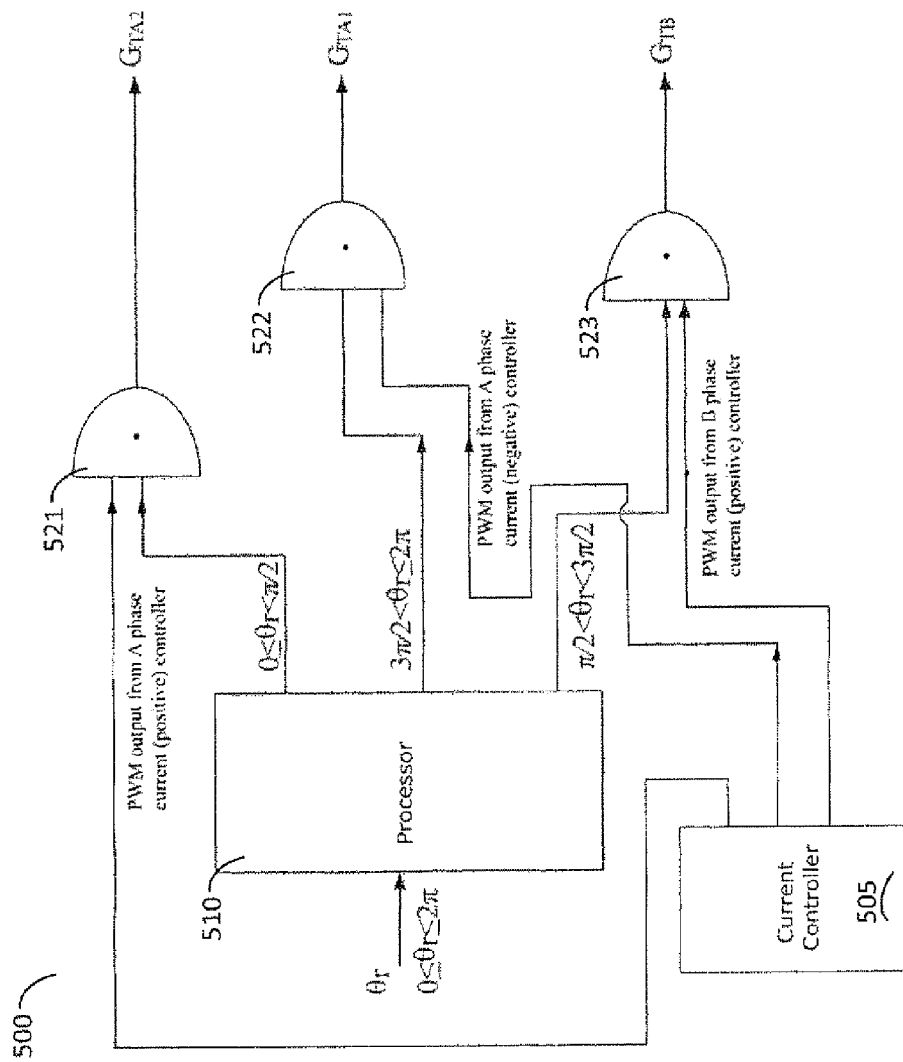
FIG. 5 illustrates a control circuit that generates gate signals for the transistors of the power converters illustrated by FIGS. 1 and 2.

FIG. 5 illustrates a control circuit that generates gate signals for transistors that energize the phase windings of an electrical machine based on the absolute position of the machine's rotor. Control circuit 500 includes a current controller 505, processor 510, logical-AND gate 521 for generating a gate signal $G_{TA2}$, logical-AND gate 522 for generating a gate signal $G_{TA1}$, and logical-AND gate 523 for generating a gate signal $G_{TB}$. Gate signal $G_{TA2}$ is applied to transistor $T_{A2}$ 112 to ensure positive current control in phase A. Negative phase A current is regulated by transistor $T_{A1}$ 110 and its gate signal is $G_{TA1}$. Positive phase B current is regulated by transistor $T_B$ 114 and its gate signal is $G_{TB}$.

Gate signals $G_{TA1}$, $G_{TA2}$, and $G_{TB}$ are produced in the following way. Current controller 505 modulates each of a phase-A positive current signal, phase-A negative current signal, and phase-B positive current signal by a carrier PWM signal so as to generate a variable duty cycle signal at the carrier PWM frequency. The variable duty cycle signal generated from each current control signal is compared, by a logical-AND gate, with a logic signal, generated by a processor 510, indicating whether the rotor of the machine is within a particular range of angular positions.

Ideal current and induced emf waveforms have been considered in the two control techniques disclosed herein. In practice, currents and induced emfs deviate from their ideal shapes. Consideration has to be built into control techniques to cope with practical realities. For example, in current control, a finite time is allowed in the rise and fall of the currents. Accordingly, to fully harvest electromagnetic torque and power of a machine, current references are advanced in their onsets and turned off in advance of their ideal turn-off times. Advancing turn-on and turn-off for current control in practical implementations of the control techniques and power converters can make dwell periods (or conduction intervals) of phase currents greater than that of the ideal intervals. The turn-on and turn-off instances for the transistors can be programmed or compensated in the controller depending on the machine-phase inductances and current reference magnitudes, so that the torque output is smooth and equal to the limit of the desired torque magnitude. Compensation methods are described, for example, in R. Krishnan, "Switched reluctance motor drives", CRC Press, 2001, the content of which is incorporated herein by reference.

The foregoing has been a detailed description of possible embodiments of the invention. Other embodiments of the invention will be apparent to those skilled in the art from consideration of the specification, drawings, and practice of the invention. Accordingly, it is intended that this specification and its disclosed embodiments be considered as exemplary only, with the true scope and spirit of the invention being indicated by the following claims.

What is claimed is:

1. A method of operating an electrical machine having first and second phase windings, the method comprising:
   applying positive first current to the first phase winding while the first phase winding's back electromotive force (emf) is positive;
   applying negative second current to the first phase winding while the first phase winding's back emf is negative; and
   applying positive third current to the second phase winding while the second phase winding's back emf is positive,
   wherein:
   the first current is conducted through a circuit consisting of a battery, the first phase winding, and a first switch that is operating in a conductive state,
   the second current is conducted through a circuit consisting of a first capacitive storage element, the battery, the first phase winding, and a second switch that is operating in a conductive state, and
   the third current is conducted through a circuit consisting of the battery, the second phase winding, and a third switch that is operating in a conductive state.

2. The method of claim 1, further comprising discharging energy stored in the first phase winding, upon discontinuing the conduction of the first current through the first switch, by conducting current through a circuit consisting of the first phase winding, a first unidirectional current device, the first capacitive storage element, and a second capacitive storage element.

3. The method of claim 1, further comprising discharging energy stored in the first phase winding, upon discontinuing the conduction of the second current through the second switch, by conducting current through a circuit consisting of the first phase winding, the battery, and a unidirectional current device.

4. The method of claim 2, further comprising discharging energy stored in the first phase winding, upon discontinuing the conduction of the second current through the second switch, by conducting current through a circuit consisting of the first phase winding, the battery, and a second unidirectional current device.

5. The method of claim 1, further comprising discharging energy stored in the second phase winding, upon discontinuing the conduction of the third current through the third switch, by conducting current through a circuit consisting of the second phase winding, a unidirectional current device, the first capacitive storage element, and a second capacitive storage element.

6. The method of claim 4, further comprising discharging energy stored in the second phase winding, upon discontinuing the conduction of the third current through the third switch, by conducting current through a circuit consisting of the second phase winding, a third unidirectional current device, and the first and second capacitive storage elements.

7. The method of claim 3, wherein the discontinuation of the second current through the first winding occurs while its back emf is negative.

8. The method of claim 1, further comprising applying negative fourth current to the second phase winding while its back emf is negative.

9. The method of claim 8, wherein the fourth current is conducted through a circuit consisting of the first capacitive element, the second phase winding, the battery, and a fourth switch that is operating in a conductive state.

10. The method of claim 6, further comprising:
applying negative fourth current to the second phase winding while its back emf is negative, wherein
the fourth current is conducted through a circuit consisting of the first capacitive element, the second phase winding, the battery, and a fourth switch that is operating in a conductive state.

11. The method of claim 10, further comprising discharging energy stored in the second phase winding, upon discontinuing the conduction of the fourth current through the fourth switch, by conducting current through a circuit consisting of the second phase winding, the battery, and a fourth unidirectional current device.

12. The method of claim 1, wherein:
each of the first and second phase windings' back emf is positive for 180 degrees of rotation of a rotor of the electrical machine and negative for 180 degrees of rotor rotation, and
the periods for which the first and second phase windings' back emfs are positive overlap by 90 degrees of rotor rotation.

13. A method of operating an electrical machine having a stator, a rotor, and first and second phase windings, the method comprising:
applying positive first current to the first phase winding while the rotor is within a first range of rotation with respect to the stator;
applying negative second current to the first phase winding while the rotor is within a second range of rotation with respect to the stator; and
applying positive third current to the second phase winding while the rotor is within a third range of rotation with respect to the stator, wherein:
the first current is conducted through a circuit consisting of a battery, the first phase winding, and a first switch that is operating in a conductive state,
the second current is conducted through a circuit consisting of a first capacitive storage element, the battery, the first phase winding, and a second switch that is operating in a conductive state, and
the third current is conducted through a circuit consisting of the battery, the second phase winding, and a third switch that is operating in a conductive state.

14. The method of claim 13, further comprising discharging energy stored in the first phase winding, upon discontinuing the conduction of the first current through the first switch, by conducting current through a circuit consisting of the first phase winding, a first unidirectional current device, the first capacitive storage element, and a second capacitive storage element.

15. The method of claim 13, further comprising discharging energy stored in the first phase winding, upon discontinuing the conduction of the second current through the second switch, by conducting current through a circuit consisting of the first phase winding, the battery, and a unidirectional current device.

16. The method of claim 14, further comprising discharging energy stored in the first phase winding, upon discontinuing the conduction of the second current through the second switch, by conducting current through a circuit consisting of the first phase winding, the battery, and a second unidirectional current device.

17. The method of claim 13, further comprising discharging energy stored in the second phase winding, upon discontinuing the conduction of the third current through the third switch, by conducting current through a circuit consisting of the second phase winding, a unidirectional current device, the first capacitive storage element, and a second capacitive storage element.

18. The method of claim 16, further comprising discharging energy stored in the second phase winding, upon discontinuing the conduction of the third current through the third switch, by conducting current through a circuit consisting of the second phase winding, a third unidirectional current device, and the first and second capacitive storage elements.

19. The method of claim 13, further comprising:
applying negative fourth current to the second phase winding while the rotor is within the first and third ranges of rotation with respect to the stator, wherein
the fourth current is conducted through a circuit consisting of the first capacitive element, the second phase winding, the battery, and a fourth switch that is operating in a conductive state.

20. The method of claim 18, further comprising:
applying negative fourth current to the second phase winding while the rotor is within the first and third ranges of rotation with respect to the stator, wherein
the fourth current is conducted through a circuit consisting of the first capacitive element, the second phase winding, the battery, and a fourth switch that is operating in a conductive state.

21. The method of claim 20, further comprising discharging energy stored in the second phase winding, upon discontinuing the conduction of the fourth current through the fourth switch, by conducting current through a circuit consisting of the second phase winding, the battery, and a fourth unidirectional current device.

22. The method of claim 13, wherein the first, second, and third ranges are non-overlapping.

23. The method of claim 22, wherein:
the first and second ranges of rotation each has 90 degrees, and
the third range of rotation has 180 degrees.

24. The method of claim 13, further comprising discontinuing the application of current to the first phase winding while the rotor is within the third range of rotation.

25. An electrical machine system comprising:
an electrical machine having a stator, a rotor, and first and second phase windings;
a processor that generates a logical-TRUE condition for; (1) a first rotor range signal when the rotor is within a first range of rotation with respect to the stator, (2) a second rotor range signal when the rotor is within a second range of rotation with respect to the stator, and (3) a third rotor range signal when the rotor is within a third range of rotation with respect to the stator, and otherwise generates a logical-FALSE condition for the first, second, and third rotor range signals;
a phase current controller that generates a logical-TRUE condition for: (1) a first phase current signal when both a pulse width modulation (PWM) signal has a logical-TRUE condition and current conducted through the first phase winding is positive, (2) a second phase current signal when both the PWM signal has a logical-TRUE condition and current conducted through the first phase winding is negative, and (3) a third phase current signal when both the PWM signal has a logical-TRUE condition and current conducted through the second phase winding is positive, and otherwise generates a logical-FALSE condition for the first, second, and third phase current signals;

logic circuitry that generates a logical-TRUE condition for: (1) a first gate signal when both the first rotor range signal and first phase current signal have a logical-TRUE condition, (2) a second gate signal when both the second rotor range signal and second phase current signal have a logical-TRUE condition, and (3) a third gate signal when both the third rotor range signal and third phase current signal have a logical-TRUE condition, and otherwise generates a logical-FALSE condition for the first, second, and third gate signals; and a power converter that: (1) conducts current from a first source through the first phase winding when the first gate signal has a logical-TRUE condition, (2) conducts current from a second source through the first phase winding when the second gate signal has a logical-TRUE condition, and (3) conducts current from either the first or second source through the second phase winding when the third gate signal has a logical-TRUE condition.

26. The electrical machine system of claim 25, wherein the first source is a battery and the second source is a direct current voltage supply.

27. The electrical machine system of claim 25, wherein the polarity of current conducted by the first source through the first phase winding is opposite to that conducted by the second source through the first phase winding.

28. The electrical machine system of claim 25, wherein the power converter:
    conducts current from the second source through the second phase winding when the first gate signal has a logical-FALSE condition and the second and third gate signals have a logical-TRUE condition, and
    conducts current from the first source through the second phase winding when the second gate signal has a logical-FALSE condition and the third gate signal has a logical-TRUE condition.

29. The electrical machine system of claim 28, wherein the power converter conducts current from the second source through the first and second phase windings when the first gate signal has a logical-FALSE condition and the first and third gate signals have a logical-TRUE condition.

30. The electrical machine system of claim 25, wherein the first and second ranges of rotation are each 90 degrees and the third range of rotation is 180 degrees.

* * * * *